ns, Haidt, Haffner &

United States Patent [19]

Watabe et al.

[11] 4,211,676
[45] Jul. 8, 1980

[54] PROCESS FOR RECLAIMING SCRAP VULCANIZED RUBBER

[75] Inventors: Yoji Watabe, Akikawa; Yoshihiko Fujii; Shiro Anzai, both of Higashi Murayama; Junji Furukawa, Kyoto, all of Japan

[73] Assignee: Bridgestone Tire Company Limited, Tokyo, Japan

[21] Appl. No.: 911,197

[22] Filed: May 31, 1978

[30] Foreign Application Priority Data

Jun. 7, 1977 [JP] Japan .................................. 52-66277
Jun. 10, 1977 [JP] Japan .................................. 52-67824
Jun. 17, 1977 [JP] Japan .................................. 52-70971
Jul. 12, 1977 [JP] Japan .................................. 52-82567

[51] Int. Cl.$^2$ ........................ C08L 17/00; C08J 11/04
[52] U.S. Cl. ..................................... 260/2.3; 260/710; 260/711; 260/714; 260/715; 260/716
[58] Field of Search .......... 260/2.3, 711, 710, 714–716

[56] References Cited

U.S. PATENT DOCUMENTS 2,415,449   2/1947   Sverdrup et al. ................. 260/710 X

*Primary Examiner*—Carman J. Seccuro
*Attorney, Agent, or Firm*—Brooks, Haidt, Haffner & Delahunty

[57] ABSTRACT

Scrap vulcanized rubber is reclaimed by mixing with a reclaiming agent selected from (a) 1,8-diazabicyclo-[5,4,0]-undecene-7, (DBU) (b) phenol salts of DBU, (c) carboxylic acid salts of DBU, (d) thiuramsulfide compounds, (e) aromatic disulfides, and (f) benzene sulfinic acid compounds or benzene sulfonyl hydrazides, provided that (e) aromatic disulfides are not used alone.

Aliphatic or alicyclic amines may be used together with a compound selected from compounds (a)–(f) to enhance the reclaiming effect.

14 Claims, No Drawings

PROCESS FOR RECLAIMING SCRAP VULCANIZED RUBBER

BACKGROUND OF THE INVENTION

1. Field of the Invention

This invention relates to a process for reclaiming scrap vulcanized rubber by using a novel reclaiming agent.

2. Description of the Prior Art

As a result of recent remarkable development of motorization, amount of scrap tires has increased rapidly and its treatment has become a big problem. Heretofore, scrap tires have been used for filling-up, the structural shape itself has been used or they have been simply burned. However, these treatments are not desirable from viewpoint of prevention of environmental pollution and effective use of material sources.

On the contrary, there have been studies processes for devulcanizing scrap vulcanized rubber to produce reclaimed rubber and processes for recovering oils or carbon black by thermal decomposition of scrap vulcanized rubber with chemicals.

Heretofore there have been proposed various reclaiming methods for scrap vulcanized rubber, but most of them need a high temperature over 150° C., and therefore such methods can be carried out only where a particular apparatus therefor is available.

Further, most of the conventional reclaiming methods were developed for natural rubber and could not effectively reclaim rubbers containing a large portion of synthetic rubber.

As a reclaiming agent, dixylyl disulfide is known (cf. Encyclopedia Polymer Science Technology, 1970, Vol. 12, pp. 341-355). This reclaiming method using dixylyl disulfide is known as oil pan method which comprises treating scrap vulcanized rubber in an autoclave at 190°-200° C. for 4-5 hours, but physical properties of the rubber thus reclaimed are not so good.

SUMMARY OF THE INVENTION

According to the present invention, there is provided a process for reclaiming scrap vulcanized rubber which comprises mixing 100 parts by weight of scrap vulcanized diene rubber with 0.05-10 parts by weight of at least one reclaiming agent selected from the group consisting of:

(a) 1,8-diazabicyclo-[5,4,0]undecene-7, (b) unsubstituted or substituted phenol salts of 1,8-diazabicyclo-[5,4,0]undecene-7, (c) carboxylic acid salts of 1,8-diazabicyclo-[5,4,0]undecene -7, (d) thiuramsulfide compounds of the formula

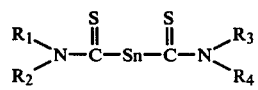

where $R_1$, $R_2$, $R_3$ and $R_4$ are, similar or dissimilar, hydrocarbon group having 1-6 carbon atoms, and $R_1$ and $R_2$, taken together, may form a ring including the nitrogen atom to which $R_1$ and $R_2$ are bonded, and $R_3$ and $R_4$, taken together, may form a ring including the nitrogen atom to which $R_3$ and $R_4$ are bonded, and n is 1 or 2, (e) aromatic disulfides, and (f) benzene sulfinic acid compounds or benzene sulfonyl hydrazides of the formula

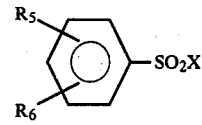

where X is selected from the group consisting of H, Li, Na, K, and —NHNH$_2$, and $R_5$ and $R_6$ are, similar or dissimilar, selected from the group consisting of H and alkyl of $C_{1-4}$, provided that the compound (e) is not used alone.

According to another aspect of the present invention is to provide a process for reclaiming scrap vulcanized rubber which comprises mixing 100 parts by weight of scrap vulcanized rubber with 0.05-10 parts by weight of at least one member selected from the group consisting of compounds (a)-(f) and 0.05-5 parts by weight of at least one member selected from the group consisting of aliphatic amines and alicyclic amines.

It is an object of the present invention to provide a process for reclaiming scrap vulcanized rubber effectively at relatively low temperatures.

It is another object of the present invention to provide a process for reclaiming effectively scrap vulcanized rubber mainly composed of synthetic rubber such as SBR which can not be easily reclaimed.

It is a further object of the present invention to provide a process for producing a reclaimed rubber having properties better than those of a reclaimed rubber obtained by a conventional method.

It is still another object of the present invention to provide a process for reclaiming scrap vulcanized rubber which can be carried out by apparatuses such as roll, kneader, brabender, banbury and reclaimeter usually possessed by rubber manufacturers.

DESCRIPTION OF THE PREFERRED EMBODIMENTS

The reclaiming agent used in the present invention is one selected from the compounds (a)-(f) as mentioned above or a mixture of the compounds (a)-(f). However, compound (e) is not used alone, but in combination with at least one compound selected from compounds (a)-(d) and (f) because the compound (e) is not so effective when used alone.

Compounds (a) is 1,8-diazabicyclo-[5,4,0]undecene-7 (hereinafter referred to as DBU).

Compounds (b) are unsubstituted or substituted phenol salts of DBU. There may be mentioned, for example, phenol salt of DBU, cresol salts of DBU, resorcinol salts of DBU and hydroquinone salts of DBU. Among them phenol salt of DBU is preferable.

Compounds (c) are carboxylic acid salts of DBU. Examples of the carboxylic acid are: saturated or unsaturated aliphatic carboxylic acids such as formic acid, acetic acid, propionic acid, n- and iso-butyric acids, n- and iso-valeric acids, neopentanoic acid, caprylic acid, enanthic acid, 2-ethylhexanoic acid, pelargonic acid, capric acid, neodecanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, acrylic acid, methacrylic acid, crotonic acid, isocrotonic acid, undecylic acid, oleic acid, elaidic acid, cetoleic acid, erucic acid, brassidic acid, sorbic acid, linoleic acid, linolenic acid, arachidonic acid, propiolic acid, stearolic acid, oxalic acid, succinic acid, adipic acid, selacholeic acid, and the like; aromatic carboxylic acids such as benzoic acid, toluic acid and the like; and resin acids such as rosin, tall oil and the like.

Among them, salts of aliphatic carboxylic acids having 1–10 carbon atoms are preferable and in particular, 2-ethylhexanoic acid salt of DBU is preferable.

Compounds (d) are thiuramsulfide compounds of the formula

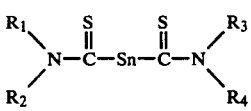

where $R_1$, $R_2$, $R_3$ and $R_4$ are, similar or dissimilar, hydrocarbon group having 1–6 carbon atoms, and $R_1$ and $R_2$, taken together, may form a ring including the nitrogen atom to which $R_1$ and $R_2$ are bonded, and $R_3$ and $R_4$, taken together, may form a ring including the nitrogen atom to which $R_3$ and $R_4$ are bonded, and n is 1 or 2.

The compounds (d) correspond to thiurammonosulfides and thiuramdisulfides.

Representative thiurammonosulfides are:
tetramethyl thiurammonosulfide,
tetraethyl thiurammonosulfide,
tetrapropyl thiurammonosulfide,
tetrabutyl thiurammonosulfide,
tetrapentyl thiurammonosulfide,
tetrahexyl thiurammonosulfide, and
dipentamethylene thiurammonosulfide.

Representative thiuramdisulfides are:
tetramethyl thiuramdisulfide,
tetraethyl thiuramdisulfide,
tetrapropyl thiuramdisulfide,
tetrabutyl thiuramdisulfide,
tetrapentyl thiuramdisulfide,
tetrahexyl thiuramdisulfide,
dipentamethylene thiuramdisulfide, and
N,N'-diethyl-N,N'-diphenyl thiuramdisulfide.

The thiuramdisulfides are better than the thiurammonosulfides with respect to the reclaiming effect. However, the thiurammonosulfides can show an excellent reclaiming effect when used in combination of compounds (a)–(c), or aliphatic or alicyclic amines (infra).

Among the above compounds, tetramethyl thiuramdisulfide, tetraethyl thiuramdisulfide, tetrapropyl thiuramdisulfide, tetrabutyl thiuramdisulfide, and tetrapentyl thiuramdisulfide are preferable.

Thiuramtrisulfides and thiuramtetrasulfides which are similar to the compounds (d) above in point of chemical structure show only a lower degree of reclaiming effect and are not within the scope of the present invention.

Compounds (e) are aromatic disulfides. Representative aromatic disulfides are diphenyldisulfide, ditolyldisulfide, dixylyldisulfide and the like.

When the compounds (e) is used alone as a reclaiming agent, its reclaiming effect is a little. However, when it is used in combination with a compound selected from compounds (a)–(d) and (f) and aliphatic and alicylic amines, it behaves as an effective reclaiming agent.

Compounds (f) are benzene sulfinic acid compounds or benzenesulfonyl hydrazides of the formula

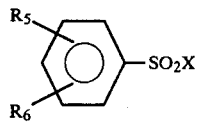

where X is selected from the group consisting of H, Li, Na, K and —NHNH$_2$, and R$_5$ and R$_6$ are, similar or dissimilar, selected from the group consisting of H and alkyl of C$_{1-4}$.

Compounds f) includes a kind of benzene sulfinic acid derivatives, a kind of salts of benzene sulfinic acid derivatives and a kind of benzene sulfonyl hydrazide derivatives.

Representative benzene sulfinic acid derivatives are alkyl substituted or unsubstituted benzene sulfinic acid such as benzene sulfinic acid, p-toluenesulfinic acid, o-toluene-sulfinic acid and the like.

Representative salts of benzene sulfinic acid derivatives are alkali metal salts of unsubstituted or substituted benzene sulfinic acids such as lithium benzenesulfinate, sodium benzenesulfinate, potassium benzenesulfinate, lithium p-toluenesulfinate, sodium p-toluenesulfinate, potassium p-toluenesulfinate, sodium o-toluenesulfinate, sodium p-ethylbenzenesulfinate, sodium o-ethylbenzenesulfinate, sodium 2,4-dimethylbenzenesulfinate and the like.

Among them, benzenesulfinic acid, p-toluenesulfinic acid, sodium benzenesulfinate and sodium p-toluenesulfinate are preferable.

Representative benzenesulfonyl hydrazide derivatives are benzenesulfonyl hydrazide, p-toluenesulfonyl hydrazide, o-toluenesulfonyl hydrazide, p-ethylbenzenesulfonyl hydrazide, o-ethylbenzenesulfonyl hydrazide, 2,4-dimethylbenzenesulfonyl hydrazide and the like.

Among them, benzenesulfonyl hydrazide and p-toluenesulfonyl hydrazide are preferable.

Though sulfonic acid, sulfonyl chloride, sulfonamide, and esters of sulfonic acid have a chemical structure similar to the above mentioned compounds used in the present invention, they do not have any reclaiming effect.

When the compounds (a)–(f) are used in combination, a combination of compound (d) and at least one of compounds (a)–(c), a combination of compound (e) and at least one of compounds (a)–(c) and a combination of compound (f) and at least one of compounds (a)–(c) are preferable.

The amount of the reclaiming agent is preferably such that the reclaiming of scrap vulcanized rubber can be effectively conducted and in addition, vulcanization of the resulting reclaimed rubber is not hindered.

From such viewpoint, 0.05–10 parts by weight of the reclaiming agent per 100 parts by weight of scrap vulcanized rubber is usually employed, and 0.1–5 parts by weight of the reclaiming agent per 100 parts by weight of scrap vulcanized rubber is preferable.

The present inventors have further found that the reclaiming effect can be enhanced by using the reclaiming agent (a)–(f) in combination with an aliphatic or alicyclic amine. Those amines are primary, secondary or tertiary aliphatic or alicyclic amines having 1–10 carbon atoms.

Representative amines are:

methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, cyclohexylamine, dicyclohexylamine, morpholine, piperadine, diethanolamine, triethanolamine, ethylenediamine, hexamethylenediamine, diethylenetriamine, triethylenetetramine, triethylenediamine, and the like.

The amines are usually used in an amount of 0.05–5 parts by weight, preferably 0.1–2 parts by weight, per 100 parts by weight of scrap vulcanized rubber. Further, molar ratio of the amine to a compound of (a)–(f) is usually 1/9–9/1, preferably 1/3–3/1.

The reclaiming agent according to the present invention is preferably used together with oils. As the oils, there may be used process oil, softening oil, and reclaiming oil used in rubber industry.

For example, there may be mentioned paraffinic, naphthenic, and aromatic process oils, high boiling oils such as petroleum asphalt, coal tar and the like, and vegetable oils such as tall oil, rosin, pine tar, dipentene and the like. The more the amount of oil, the more is the reclaiming effect. However, when excess oil is used, mechanical properties of the resulting reclaimed rubber decrease. Therefore, usually 1–40 parts by weight of oil, preferably 5–20 parts by weight of oil, per 100 parts by weight of scrap vulcanized rubber is used.

Reclaiming of scrap vulcanized rubber may be carried out by mixing the reclaiming agent according to the present invention with scrap vulcanized rubber, if desired, together with oils. The mixing may be effected at a temperature ranging from room temperature to 270° C., preferably at 20°–200° C. However, the temperature may be optionally selected depending upon the purpose, apparatus and reclaiming agent. Among them, when reclaiming agent (a)–(e) and their mixture, and a combination of these reclaiming agents and aliphatic or alicyclic amines are used and the mixing is carried out in a conventional apparatus such as rolls, it is preferable to carry out the mixing at a temperature lower than 120° C. from the viewpoint of the workability and the reclaiming effect.

When reclaiming agent f) is used, it is effective to carry out the mixing at a relatively high temperature, for example, at 150° C., by a conventional apparatus such as brabender.

The mixing time varies depending upon the desired degree of plasticity. Usually the mixture becomes plasticized in 5–60 min.

Representative mixing apparatuses are roll, kneader, brabender, banbury and reclaimeter. When rolls are used, the reclaiming can be conducted effectively, in particular. The mixing effect can be enhanced by narrowing the clearance.

Other than the above mentioned reclaiming procedures, reclaiming may be effected in such a way that the reclaiming agent according to the present invention is dissolved in an appropriate solvent followed by soaking powders of scrap vulcanized rubber in the resulting solution.

The reclaimed rubbers produced by the process of the present invention can be used, alone or in combination with a new rubber, as tires, belts, hoses, sheets, packings and the like.

The following examples are given for the purpose of illustration and not by way of limitation.

In the examples, degree of plasticity as an index of degree of reclaiming is measured at 100° C. and load of 12.7 kg/cm$^2$ by Rapid Plastimeter manufactured by H. W. Wallace & Co. Ltd., England. The less the value, the more is the degree of plasticity. It is practically desirable to be less than 70. Parts are parts by weight unless otherwise specified.

EXAMPLES 1–4, COMPARATIVE EXAMPLE 1

100 parts of 30 mesh powdered rubber (natural rubber about 70%, butadiene rubber about 10%, and styrene butadiene rubber about 20%) obtained from scrap tire for passenger car was mixed with DBU 2.0 parts, phenol salt of DBU 3.24 parts or 2-ethylhexanoic acid salt of DBU 3.89 parts each being 13 millimoles per 100 g of scrap vulcanized rubber) and 10 parts of a process oil in an appropriate vessel. The mixture was transferred onto rolls having a narrow clearance and passed through said clearance repeatedly to make the powdered rubber into a sheet form. The resulting sheet had a poor plasticity and still had elasticity at the initial period, but during repeating kneading, the plasticity increased rapidly. After 30 min. the rubber sheet was recovered from the rolls while the roll temperature was held at 40°–60° C.

For comparison, following the above mentioned procedure, an experiment was effected without DBU. Degree of plasticity of the resulting rubber sheet was measured. The results are shown in Table 1 below.

Table 1

| Example No. | Reclaiming agent | Amount phr | Degree of plasticity |
|---|---|---|---|
| 1 | DBU | 2.0 | 44 |
| 2 | DBU | 0.2 | 52 |
| 3 | Phenol salt of DBU | 3.24 | 45 |
| 4 | 2-ethylhexanoic acid salt of DBU | 3.89 | 45 |
| Comparative Example 1 | — | — | 80 |

As Table 1 shows, when any reclaiming agent is not used, the degree of plasticity is as high as 80 while the degree of plasticity for systems where a reclaiming agent is used is so low that the scrap vulcanized rubber is effectively reclaimed.

COMPARATIVE EXAMPLES 2–7

The procedures of Example 1 were repeated by using 100 parts of powdered rubber as used in Example 1 and 10 parts of process oil as used in Example 1 and various amines as listed in Table 2.

The results are shown in Table 2. The resulting degree of plasticity of the reclaimed rubber is ranging from 74 to 78. This shows that these amines are not effective for reclaiming. Among amines, DBU and its salts show a particularly high effect.

Table 2

| Comparison Example No. | Amines | Amount phr | Degree of plasticity |
|---|---|---|---|
| 2 | n-Butylamine | 2 | 75 |
| 3 | Di-n-butylamine | 2 | 74 |
| 4 | Tri-n-butylamine | 2 | 74 |
| 5 | p-Chloroaniline | 2 | 74 |
| 6 | Pyridine | 2 | 78 |
| 7 | Hexamethylenetetramine | 2 | 74 |

EXAMPLES 5-7

The procedure of Example 1 was repeated except that tetramethylthiuramdisulfide 0.16 parts or 1.45 parts, or tetraethylthiuramdisulfide, 1.72 parts (each corresponding to 1.3, 12 or 12 millimoles per 100 g of scrap vulcanized rubber; one molecule of disulfide is calculated as two molecules since it has two groups participating in reclaiming) was employed. The results including degree of plasticity are shown in Table 3.

Table 3

| Example No. | Reclaiming agent | Amount phr | Degree of plasticity |
|---|---|---|---|
| 5 | Tetramethylthiuram-disulfide | 0.16 | 48 |
| 6 | Tetramethylthiuram-disulfide | 1.45 | 43 |
| 7 | Tetraethylthiuram-disulfide | 1.72 | 44 |

EXAMPLES 8-9, COMPARATIVE EXAMPLE 8

The procedures of Example 1 were repeated by using 100 parts of scrap vulcanized rubber (mainly natural rubber) of 2 mm in size obtained from scrap tire for truck and bus, 1 part of DBU or 0.8 parts of tetramethylthiuramdisulfide and 10 parts of a process oil, and the treatment was carried out for 30 min. to obtain reclaimed rubber.

Then this reclaimed rubber was mixed and vulcanized according to the process of JIS K6313 to form a slab sheet of 2 mm thickness, and JIS hardness (Hd), tensile strength at breaking point ($T_B$) and elongation at breaking point ($E_B$) of the rubber thus vulcanized were measured. For comparison, a commercially available reclaimed rubber from scrap tire for truck and bus was subjected to the procedure of JIS K 6313.

Table 4

| Example No. | Reclaiming agent | Amount phr | Degree of plasticity | Hd | $T_B$ (kg/cm²) | $E_B$ (%) |
|---|---|---|---|---|---|---|
| 8 | DBU | 1.0 | 43 | 64 | 137 | 340 |
| 9 | Tetramethyl-thiuram-disulfide | 0.8 | 29 | 64 | 96 | 230 |
| Comparative Ex. 8 | — | — | — | 56 | 74 | 310 |

The above results show that the physical properties of vulcanized product of the rubber reclaimed according to the present invention are better than those of the commercially available reclaimed rubber.

EXAMPLE 10, COMPARATIVE EXAMPLE 9

100 parts of 30 mesh powdered rubber (natural rubber 75%, styrene-butadiene rubber about 15%, and butadiene rubber about 10%) obtained from scrap tire for truck and bus was mixed with 1 part of p-toluene-sulfinic acid, placed in a brabender kept at 150° C. and mixed at 70 r.p.m. of the rotor for 45 min.

The resulting mixture was then transferred onto roll having a narrow clearance and mixed additionally for 5 min. The mixture became immediately a sheet form and showed plasticity. The degree of plasticity of the resulting rubber sheet was 33. On the contrary, the degree of plasticity of a rubber obtained from the system excluding p-toluenesulfinic acid was 91.

EXAMPLES 11-12, COMPARATIVE EXAMPLE 10

30 mesh powdered rubber (natural rubber 40%, and styrenebutadiene rubber 60%) obtained from scrap tire for passenger car and sodium p-toluene-sulfinate or benzene sulfonyl hydrazide were mixed in the amounts as shown in Table 5, and mixed by a brabender at 150° C. At the beginning the mixture remained in a powder form, but gradually became blocks having stickiness. After 45 minutes the rubber block was placed on a roll and passed through a narrow clearance several times to make into a sheet form. For the purpose of comparison, an experiment was made without using the reclaiming agent. The results are shown in Table 5 below.

Table 5

| Example No. | Reclaiming agent | Amount phr | Degree of plasticity |
|---|---|---|---|
| 11 | Sodium p-toluenesulfinate | 2.74 | 32 |
| 12 | Benzenesulfonyl hydrazide | 2.21 | 31 |
| Comparative Example 10 | — | — | 61 |

EXAMPLE 13, COMPARATIVE EXAMPLE 11

100 parts of scrap vulcanized rubber (mainly composed of natural rubber) of 2 mm in size obtained from waste tire for truck and bus, 1.1 parts of benzenesulfonyl hydrazide and 10 parts of process oil were treated in a way similar to Example 1 to obtain a reclaimed rubber having a degree of plasticity of 52.

According to the formula of JIS K6313, the resulting reclaimed rubber was compounded and vulcanized to produce a slab sheet of 2 mm in thickness, and then JIS hardness (Hd), tensile strength at breaking point ($T_B$) and elongation at breaking point ($E_B$) of the slab sheet were measured. The results were: Hd=59, $T_B$=131 kg/cm², and $E_B$=360%.

For comparison, commercially available reclaimed rubber produced from waste tire for truck and bus was compounded and vulcanized according to the formula of JIS K6313, and physical properties of the resulting product were measured. The results were: Hd=56, $T_B$=74 kg/cm² and $E_B$=310%.

The above results show that the physical properties of vulcanized product of the rubber reclaimed according to the present invention are better than those of the commercially available reclaimed rubber.

EXAMPLE 14, COMPARATIVE EXAMPLES 12-17

100 parts of 30 mesh powdered rubber (natural rubber about 70%, butadiene rubber about 10%, and styrene butadiene rubber about 20%) obtained from scrap tire for passenger car was mixed with 2.21 parts of benzenesulfonyl hydrazide (13 millimoles per 100 g of scrap vulcanized rubber) and 10 parts of a process oil in an appropriate vessel. The mixture was transferred onto rolls having a narrow clearance and passed through said clearance repeatedly to make the powdered rubber into a sheet form. The resulting sheet had a poor plasticity and still had elasticity at the initial period, but during repeating kneading, the plasticity increased rapidly.

After 30 min. the rubber sheet was recovered from the rolls while the roll temperature was held at 40°–65° C.

For comparison, following the above mentioned procedure, an experiment was effected without benzenesulfonyl hydrazide. Further, various benzene sulfonic acid derivatives (13 millimoles per 100 g) were used to effect the same treatment. The results (degree of plasticity) are as shown in Table 6.

Table 6

| Example No. | Benzenesulfonic acid derivatives | Amount phr | Degree of plasticity |
|---|---|---|---|
| Example 14 | ⌬—SO$_2$NHNH$_2$ | 2.21 | 56 |
| Comparative Example 12 | — | — | 80 |
| Comparative Example 13 | CH$_3$—⌬—SO$_2$NH$_2$ | 2.19 | 74 |
| Comparative Example 14 | CH$_3$—⌬—SO$_2$N(C$_2$H$_5$)$_2$ | 2.19 | 79 |
| Comparative Example 15 |  | 2.78 | 82 |
| Comparative Example 16 | CH$_3$—⌬—SO$_2$N(NO)—CH$_3$ | 2.44 | 85 |
| Comparative Example 17 | CH$_3$—⌬—SO$_2$Cl | 2.18 | 80 |
|  | CH$_3$—⌬—SO$_2$CH$_3$ |  |  |

As is clear from Table 6 above, only the sulfonyl hydrazide derivative shows a particular reclaiming effect.

EXAMPLE 15

100 parts of scrap vulcanized rubber (natural rubber 80% and styrene-butadiene rubber 20%) of 2 mm size obtained from waste tire for truck and bus, 0.23 parts of benzenesulfonyl hydrazide and 10 parts of process oil were mixed, placed on rolls and treated for 35 min. in a manner similar to Example 14.

For comparison, an experiment was effected without benzenesulfonyl hydrazide. Degree of plasticity was 64 when benzenesulfonyl hydrazide was not used while it was 53 when benzenesulfonyl hydrazide was used.

EXAMPLES 16–22, COMPARATIVE EXAMPLE 18

100 parts of 30 mesh powdered rubber (natural rubber about 65% and styrene-butadiene rubber about 35%) obtained from scrap tire for passenger car was mixed with a reclaiming agent in an amount as shown in Table 7 and 10 parts of process oil, transferred onto rolls having a narrow clearance kept at 40°–60° C. and passed through said clearance repeatedly to make the powdered rubber into a sheet form. The resulting sheet had a poor plasticity and still had elasticity at the initial period, but during repeating kneading, the plasticity increased rapidly. After 30 min. the rubber sheet was recovered from the rolls. Degree of plasticity of the rubber sheet thus prepared was measured. The results are shown in Table 7.

Table 7

| Example No. | Reclaiming agent 1 | Amount phr | Reclaiming agent 2 | Amount phr | Degree of plasticity |
|---|---|---|---|---|---|
| 16 | p-Toluene-sulfinic acid | 1.0 | DBU | 1.0 | 33 |
| 17 | p-Toluene-sulfinic acid |  | Phenol salt of DBU | 1.6 | 32 |
| 18 | p-Toluene-sulfinic acid | 1.0 | 2-Ethylhexanoate of DBU | 1.9 | 35 |
| 19 | Tetramethyl-thiurammonosulfide | 0.6 | DBU | 1.0 | 41 |
| 20 | Tetramethyl-thiuramdisulfide | 0.8 | " | " | 34 |
| 21 | Tetraethyl-thiuramdisulfide | 1.0 | " | " | 32 |
| 22 | Dixylyl disulfide | 0.9 | " | " | 45 |
| Comparative Example 18 | Dixylyl disulfide | 1.8 | — | — | 71 |

Table 7 shows that combinations of the reclaiming agents in the present invention also result in effective reclaiming of scrap vulcanized rubber, but when dixylyl sulfide, an aromatic disulfide, was used alone, the reclaiming agent is low.

EXAMPLES 23–24, COMPARATIVE EXAMPLE 19

100 parts of scrap vulcanized rubber (mainly composed of natural rubber) of 2 mm in size obtained from waste tire for truck and bus, 0.5 parts of p-toluenesulfinic acid, 0.5 parts of DBU and 10 parts of process oil were treated in a way similar to Example 16 to obtain a reclaimed rubber having a degree of plasticity of 24.

According to the formula of JIS K6313, the resulting reclaimed rubber was compounded and vulcanized to produce a slab sheet of 2 mm in thickness, and then JIS hardness (Hd), tensile strength at breaking point (T$_B$)

and elongation at breaking point ($E_B$) of the slab sheet were measured. The results were: Hd61, $T_B=170$ kg/cm$^2$, and $E_B=360\%$.

When 0.4 parts of tetramethylthiuram disulfide and 0.5 parts of DBU were used in the above experiment in place of the reclaiming agents, the results were: Degree of plasticity=22, Hd=70, $T_B=113$ kg/cm$^2$ and $E_B=230\%$.

For comparison, commercially available reclaimed rubber produced from waste tire for truck and bus was compounded and vulcanized according to the formula of JIS K6313, and physical properties of the resulting product were measured. The results were: Hd=56, $T_B=74$ kg/cm$^2$ and $E_B=310\%$.

The above results show that the physical properties of vulcanized product of the rubber reclaimed according to the present invention are better than those of the commercially available reclaimed rubber.

EXAMPLES 25-26

100 parts of scrap vulcanized rubber (natural rubber 80% and styrene-butadiene rubber 20%) of 2 mm in size obtained from waste tire for truck and bus, 10 parts of process oil, 0.1 part of p-toluenesulfinic acid and 0.1 part of DBU were treated in a way similar to Example 16 and mixed for 30 min. to obtain a reclaimed rubber having a degree of plasticity of 46 and physical properties: Hd=58, $T_B=82$ kg/cm$^2$ and $E_B=270\%$.

The above procedure was repeated except that 0.08 parts of tetramethylthiuram disulfide and 0.1 part of DBU were used in place of the reclaiming agents, and there was obtained a reclaimed rubber having a degree of plasticity of 45 and physical properties: Hd=60, $T_B=102$ kg/cm$^2$ and $E_B=300\%$.

As is clear from the above experiments, the reclaiming agent according to the present invention can show a large reclaiming effect even when used in a small amount of physical properties of the resulting reclaimed rubber are excellent.

EXAMPLES 27-28

100 parts of powdered rubber as used in Example 16, 2.0 parts of p-toluenesulfinic acid or a combination of 1.0 part of p-toluenesulfinic acid and 1.0 part of DBU were mixed and the resulting mixture was mixed by a brabender at 150° C. for 45 min. and then passed through a narrow clearance of rolls for 5 min. to form each sheet. The degree of plasticity was 26 and 36, respectively. This shows that the sheets were sufficiently plasticized.

EXAMPLES 29-31, COMPARATIVE EXAMPLES 20 - 23

100 parts of powdered rubber (natural rubber about 65% and styrene-butadiene rubber about 35%) obtained from waste tire for passenger car; p-toluenesulfinic acid, sodium salt thereof, or benzenesulfonyl hydrazide in an amount as shown in Table 8 (each corresponding to 6.4 millimoles per 100 g of powdered rubber); 1.0 part of di-n-butylamine (corresponding to 7.8 millimoles per 100 g of powdered rubber), 1.0 part of pyridine or 1.0 part of p-chloroaniline; and 10 parts of process oil were mixed in a vessel. In a similar way, a sample containing no reclaiming agent and a sample containing p-toluenesulfinic acid only were prepared.

The resulting degree of plasticity of each sample is as shown in Table 8.

As is clear from Table 8, when the reclaiming agent of the present invention is combined with the amine within the scope of the present invention, the reclaiming effect is enhanced.

Amines not within the scope of the present invention such as pyridine and p-chloroaniline do not enhance the reclaiming agent.

Table 8

| Example No. | Reclaiming Agent 1 | Amount phr | Reclaiming Agent 2 | Amount phr | Degree of plasticity |
|---|---|---|---|---|---|
| 29 | p-toluenesulfinic acid | 1.0 | di-n-butylamine | 1.0 | 39 |
| 30 | Sodium p-toluenesulfinate | 1.4 | di-n-butylamine | 1.0 | 52 |
| 31 | Benzenesulfonyl hydrazide | 1.1 | di-n-butylamine | 1.0 | 46 |
| Comparative Example 20 | — | — | — | — | 80 |
| Comparative Example 21 | Toluenesulfinic acid | 2.0 | — | — | 60 |
| Comparative Example 22 | Toluenesulfinic acid | 1.0 | Pyridine | 1.0 | 69 |
| Comparative Example 23 | Toluenesulfinic acid | 1.0 | p-chloroaniline | 1.0 | 61 |

COMPARATIVE EXAMPLES 24-28

100 parts of powdered rubber as used in Example 29, 10 parts of process oil, 1.0 part of di-n-butylamine and a benzenesulfonic acid derivative as listed in Table 9 (6.5 millimoles per 100 g of powdered rubber) were subjected to a treatment as mentioned above. The results are shown in Table 9. The resulting degree of plasticity is 70-80. Therefore, they are not effective. This means that alkali metal salts of sulfinic acid and sulfonic acid hydrazide derivatives of the present invention specifically show a reclaiming effect when combined with the amine while compounds similar to, but not within the scope of the compounds of the present invention can not show a reclaiming effect when combined with the amine.

Table 9

| Comparative Example No. | Reclaiming Agent 1 | Amount phr | Reclaiming Agent 2 | Amount phr | Degree of plasticity |
|---|---|---|---|---|---|
| 24 | p-toluenesulfonamide | 1.1 | Di-n-butylamine | 1.0 | 72 |
| 25 | N,N-diethyl-p- | 1.5 | Di-n- | 1.0 | 70 |

Table 9-continued

| Comparative Example No. | Reclaiming Agent 1 | Amount phr | Reclaiming Agent 2 | Amount phr | Degree of plasticity |
| --- | --- | --- | --- | --- | --- |
|  | toluenesulfonamide |  | butylamine |  |  |
| 26 | N-methyl-N-nitroso-p-toluenesulfonamide | 1.4 | Di-n-butylamine | 1.0 | 79 |
| 27 | p-toluenesulfonyl chloride | 1.2 | Di-n-butylamine | 1.0 | 73 |
| 28 | 4-methylphenyl-methylsulfone | 1.1 | Di-n-butylamine | 1.0 | 80 |

What we claim is:

1. A process for reclaiming scrap vulcanized diene rubber which comprises mixing 100 parts by weight of scrap vulcanized diene rubber with 0.05 - 10 parts by weight of at least one reclaiming agent selected from the group consisting of:
(a) 1,8-diazabicyclo-[5, 4, 0] undecene-7,
(b) unsubstituted or substituted phenol salts of 1,8-diazabicyclo-[5, 4, 0] undecene-7,
(c) carboxylic acid salts of 1,8-diazabicyclo-[5, 4, 0] undecene-7,
(d) thiuramsulfide compounds of the formula

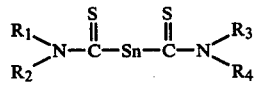

where $R_1$, $R_2$, $R_3$ and $R_4$ are, similar or dissimilar, hydrocarbon group having 1–6 carbon atoms, and $R_1$ and $R_2$, taken together, may form a ring including the nitrogen atom to which $R_1$ and $R_2$ are bonded, and $R_3$ and $R_4$, taken together, may form a ring including the nitrogen atom to which $R_3$ and $R_4$ are bonded, and n is 1 or 2,
(e) aromatic disulfides, and
(f) benzene sulfinic acid compounds or benzene sulfonyl hydrazides of the formula

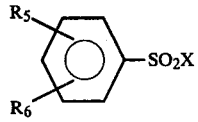

where X is selected from the group consisting of H, Li, Na, K, and $-NHNH_2$, and $R_5$ and $R_6$ are, similar or dissimilar, selected from the group consisting of H and alkyl of $C_{1-4}$, provided that the compound (e) is not used alone.

2. A process for reclaiming scrap vulcanized rubber which comprises mixing 100 parts by weight of scrap vulcanized diene rubber with 0.05–10 parts by weight of at least one member selected from the group consisting of:
(a) 1,8-diazabicyclo-[5,4,0]undecene-7,
(b) unsubstituted or substituted phenol salts of 1,8-diazabicyclo-[5,4,0]undecene-7,
(c) carboxylic acid salts of 1,8-diazabicyclo-]5,4,0]undecene-7,
(d) thiuramsulfide compounds of the formula

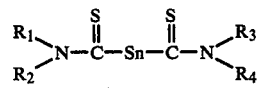

where $R_1$, $R_2$, $R_3$ and $R_4$ are, similar or dissimilar, hydrocarbon group having 1–6 carbon atoms, and $R_1$ and $R_2$, taken together, may form a ring including the nitrogen atom to which $R_1$ and $R_2$ are bonded, and $R_3$ and $R_4$, taken together, may form a ring including the nitrogen atom to which $R_3$ and $R_4$ are bonded, and n is 1 or 2,
(e) aromatic disulfides, and
(f) benzene sulfinic acid compounds or benzene sulfonyl hydrazides of the formula $$\underset{R_6}{\overset{R_5}{\bigcirc}}-SO_2X$$

where X is selected from the group consisting of H, Li, Na, K and $-NHNH_2$, and $R_5$ and $R_6$ are, similar or dissimilar, selected from the group consisting of H and alkyl of $C_{1-4}$, and 0.05–5 parts by weight of at least one member selected from the group consisting of aliphatic amines and alicyclic amines.

3. A process according to claim 1 in which 0.1–5 parts by weight of the reclaiming agent is used.

4. A process according to claim 1 in which the mixing is conducted at 20°–270° C.

5. A process according to claim 1 in which the reclaiming agent is selected from the group consisting of 1,8-diazabicyclo-[5,4,0]undecene-7, phenol salt of 1,8-diazabicyclo-[5,4,0] undecene-7, cresol salt of 1,8-diazabicyclo-[5,4,0] undecene-7, and carboxylic acid salts of 1,8-diazabicyclo-[5,4,0]undecene-7.

6. A process according to claim 1 in which the reclaiming agent is a member selected from the group consisting of a compound (d) and a mixture of a compound (d) with a compound selected from 1,8-diazabicyclo-[5,4,0]undecene-7, phenol salt of 1,8-diazabicyclo-[5,4,0]undecene-7, cresol salt of 1,8-diazabicyclo-[5,4,0]undecene-7, and carboxylic acid salts of 1,8-diazabicyclo-[5,4,0]undecene-7.

7. A process according to claim 1 in which the reclaiming agent is a mixture of a compound (e) with a compound selected from 1,8-diazabicyclo-[5,4,0]undecene-7, phenol salt of 1,8-diazabicyclo-[5,4,0]undecene-7, cresol salt of 1,8-diazabicyclo-[5,4,0]undecene-7,and carboxylic acid salts of 1,8-diazabicyclo-[5,4,0]undecene-7.

8. A process according to claim 1 in which the claiming agent is a member selected from the group consisting of a compound (f) and a mixture of a compound (f) with 1,8-diazabicyclo-[5,4,0]undecene-7, phenol salt of 1,8-diazabicyclo[5,4,0]undecene-7, cresol salt of 1,8-diazabicyclo-[5,4,0]undecene-7, and carboxylic acid salts of 1,8-diazabicyclo-[5,4,0]undecene-7.

9. A process according to claim 2 in which a compound (d) and a member selected from the group consisting of aliphatic amines and alicyclic amines are used in combination.

10. A process according to claim 2 in which a compound (e) and a member selected from the group consisting of aliphatic amines and alicyclic amines are used in combination.

11. A process according to claim 2 in which a compound (f) and a member selected from the group consisting of aliphatic amines and alicyclic amines are used in combination.

12. A process according to claim 2 in which the amine is an aliphatic amine.

13. A process according to claim 1 wherein the reclaiming agent is selected from the group consisting of 1,8-diazabicyclo[5,4,0]undecane-7 and its unsubstituted or substituted phenol and carboxylic acid salts.

14. A process according to claim 2 wherein the member is selected from the group consisting of 1,8-diazabicyclo[5,4,0]undecane-7 and its unsubstituted or substituted phenol and carboxylic acid salts.

* * * * *